United States Patent
Kutscherawy et al.

(10) Patent No.: US 10,166,622 B2
(45) Date of Patent: Jan. 1, 2019

(54) AUTOMATIC WELDING METHOD AND APPARATUS

(75) Inventors: Alexander Kutscherawy, Derby (GB); Ajay R Mande, Derby (GB)

(73) Assignee: ROLLS-ROYCE plc, London (GB)

(*) Notice: Subject to any disclaimer, the term of this patent is extended or adjusted under 35 U.S.C. 154(b) by 766 days.

(21) Appl. No.: 13/513,001

(22) PCT Filed: Dec. 15, 2010

(86) PCT No.: PCT/EP2010/069718
§ 371 (c)(1),
(2), (4) Date: May 31, 2012

(87) PCT Pub. No.: WO2011/073238
PCT Pub. Date: Jun. 23, 2011

(65) Prior Publication Data
US 2012/0234811 A1 Sep. 20, 2012

(30) Foreign Application Priority Data
Dec. 16, 2009 (GB) .................................. 0921922.1

(51) Int. Cl.
*B23K 9/00* (2006.01)
*B23K 9/095* (2006.01)
(Continued)

(52) U.S. Cl.
CPC ............ *B23K 9/0956* (2013.01); *B23K 9/125* (2013.01); *B23K 9/167* (2013.01); *B23K 9/173* (2013.01); *B23K 26/147* (2013.01)

(58) Field of Classification Search
CPC .... B23K 26/147; B23K 9/0956; B23K 9/125; B23K 9/167; B23K 9/173; B23K 9/126;
(Continued)

(56) References Cited

U.S. PATENT DOCUMENTS

| 4,737,614 A | 4/1988 | Richardson |
| 4,918,517 A | 4/1990 | Burgoon |

(Continued)

FOREIGN PATENT DOCUMENTS

| JP | A-58-86982 | 5/1983 | |
| WO | WO 2008015353 A1 * | 2/2008 | ............ B23K 9/167 |

OTHER PUBLICATIONS

French to English Machine translation of WO 2008015353.*
(Continued)

*Primary Examiner* — Michael G Hoang
(74) *Attorney, Agent, or Firm* — Oliff PLC

(57) ABSTRACT

A method of automatically controlling welding using a welding apparatus having a heat-source and a wire feed. The method includes: setting at least one welding parameter; setting a stable wire interaction position where the wire fed by the wire feed interacts with the heat generated by the heat-source so as to produce an acceptable weld; and monitoring the wire interaction position during welding. If the wire interaction position deviates from the stable wire interaction position by more than an allowable tolerance at least one welding parameter is automatically altered to return the wire interaction position to within the allowable tolerance of the stable wire interaction position. The invention also relates to an apparatus for carrying out the method.

17 Claims, 6 Drawing Sheets

(51) Int. Cl.
*B23K 9/12* (2006.01)
*B23K 9/167* (2006.01)
*B23K 9/173* (2006.01)
*B23K 26/14* (2014.01)

(58) Field of Classification Search
CPC ........ B23K 9/127; B23K 7/004; B23K 7/102;
B23K 7/105; B23K 7/107; B23K 9/00;
B23K 9/095
USPC ............ 219/75, 86.41, 121.53, 124.1, 124.5,
219/125.1, 130.01, 148, 137 R, 137.2,
219/137.31, 137.7
See application file for complete search history.

(56) References Cited

U.S. PATENT DOCUMENTS

| | | | |
|---|---|---|---|
| 2005/0103766 A1* | 5/2005 | Iizuka et al. | 219/124.34 |
| 2006/0201915 A1 | 9/2006 | Obana et al. | |
| 2010/0012638 A1* | 1/2010 | Fortain | B23K 9/167 |
| | | | 219/137 R |

OTHER PUBLICATIONS

International Search Report issued in International Patent Application No. PCT/EP2010/069718 dated Apr. 19, 2011.
Written Opinion of the International Searching Authority issued in International Patent Application No. PCT/EP2010/069718 dated Apr. 19, 2011.

* cited by examiner

AUTOMATIC WELDING METHOD AND APPARATUS

BACKGROUND OF THE INVENTION

The present invention relates to a method and apparatus for automatically controlling welding, in particular, a method and apparatus for automatically controlling welding by monitoring the wire interaction position.

Welding is widely used in many manufacturing processes in order to join components together. If the particular welding process is carried out repeatedly then it may be carried out by a robot as opposed to by an operator. This provides a number of benefits including improved repeatability. However, it is still necessary for an operator to monitor the welding process.

An operator continually visually assesses the weld deposition through monitoring a visual display unit (VDU) which is attached to a camera that is focussed on the weld point arc. Using a hand-held teach pendant that is connected to the robot, the operator can control the robot, the wire feed and the welding parameters. When the operator visually determines from the VDU that the weld deposition is not ideal, the wire feed and the welding parameters are manually overridden using the teach pendant.

For example, if the wire makes contact with the component during the welding deposition process, the integrity of the weld will be compromised at these locations. This is because the wire will not become fully molten at these locations and there is the possibility of partial wire fusion, which will affect the surface roughness of the weld deposition and the uniformity of deposition build-up. This is known as the "stubbing" effect. Further, if left unchecked, partial wire fusion can lead to the wire leaving the weld arc and solidifying on the substrate or on a previous deposited layer. This may result in activation of a robot collision control system as the robot tries to continue along a pre-programmed path. This will cause a process emergency shutdown. Therefore, when a skilled operator notices that stubbing may be about to occur, a parameter, such as the wire feed rate, is altered using the teach pendant to avoid it.

In another example, if the wire is fed in too slowly then the integrity of the deposition will be compromised at these locations. The semi-plastic relationship between the wire and the weld pool becomes intermittent and will break. This will cause an intermittent balling effect on the end of the wire, which will ultimately fall off leading to an interrupted supply of material and inconsistent weld deposition. This "blobbing" effect is known as burnback. The aforementioned effect will have an effect on subsequent deposition layers unless it is rectified by adding additional wire at those specific locations. Therefore, when a skilled operator notices that burnback may be about to occur, a parameter, such as the wire feed rate, is altered using the teach pendant to avoid it.

Whilst the manual intervention of the operator is satisfactory, it is not ideal and has a number of drawbacks. The process relies heavily on operator judgement and skill which will vary between operators. This means that the quality of the welding process may differ depending on who is operating the machine. The manual intervention also relies on the reaction time of the operator and on the system reaction time. This can result in a delay in appropriate action being taken. It also may not be possible for the operator to look at the VDU for long periods of time. This can result in the welding process having to be periodically suspended. Further, the process is reliant on the attention span of the operator which again may vary between operators.

It is therefore desirable to provide an automatic welding method and apparatus which reduces the reliance on an operator.

BRIEF SUMMARY OF THE INVENTION

According to a first aspect, the present invention provides a method of automatically controlling welding using a welding apparatus having a heat-source and a wire feed, the method comprising: setting at least one welding parameter; setting a stable wire interaction position where a wire fed by the wire feed interacts with the heat generated by the heat-source so as to produce an acceptable weld; defining a number of zones with respect to the stable wire interaction position, monitoring the wire interaction position during welding; and determining which zone the wire interaction position is located in and automatically altering at least one welding parameter to return the wire interaction position to within an allowable tolerance of the stable wire interaction position, wherein the magnitude and direction of alteration of the welding parameter is dependent on which zone the wire interaction position is located in. The allowable tolerance may be zero.

Preferably the wire interaction position is monitored by a camera. The wire feed rate may be altered to return the wire interaction position to within an allowable tolerance of the stable wire interaction position.

The zones can be circular. The zones can be concentric. The zones can be centred on the stable wire interaction position. Alternatively, the zones can be centred on the wire interaction position. Preferably, the zones are concentrically arranged around the stable wire interaction point.

The zones can include sub-zones. Preferably, the magnitude and direction of alteration of the welding parameter is dependent on which sub-zone the wire interaction position is located in. In this way, each zone and or sub-zone can have a predetermined magnitude and direction for altering the welding parameter associated with it.

The zones can be divided into quadrants. The quadrants can define the sub-zones. Each quadrant can include a plurality of sub-zones from different zones.

Preferably the welding apparatus is a TIG welding torch arranged to generate a welding arc and the wire interaction position is a wire-arc interaction point at which the wire enters the welding arc.

According to a second aspect of the present invention there is provided An apparatus for automatically controlling welding using a welding apparatus having a heat-source and a wire feed, the apparatus comprising: parameter setting device arranged for setting at least one welding parameter; wire interaction setting device arranged for setting a stable wire interaction position where the wire fed by the wire feed interacts with the heat generated by the heat-source so as to produce an acceptable weld zone defining device for defining a number of zones with respect to the stable wire interaction position; monitoring device arranged for monitoring the wire interaction position during welding; and correction device arranged to automatically alter at least one welding parameter to return the wire interaction position to within the allowable tolerance of the stable wire interaction position, wherein the magnitude and direction of alteration of the welding parameter is dependent on which zone the wire interaction position is located in. The allowable tolerance may be zero.

Preferably the monitoring means is a camera. The wire feed rate may be altered to return the wire interaction position to within an allowable tolerance of the stable wire interaction position.

The zones can be concentrically arranged around the stable wire interaction point.

The zones can include sub-zones, wherein the magnitude and direction of alteration of the welding parameter is dependent on which sub-zone the wire interaction position is located in.

The zones can be divided into quadrants which define the sub-zones.

Preferably the welding apparatus is a TIG welding torch arranged to generate a welding arc and the wire interaction position is a wire-arc interaction point at which the wire meets the welding arc.

The invention may comprise any combination of the features and/or limitations referred to herein, except combinations of such features as are mutually exclusive.

BRIEF DESCRIPTION OF THE DRAWINGS

Embodiments of the present invention will now be described, by way of example only, with reference to the accompanying drawings, in which.

DETAILED DESCRIPTION

Figure 1:
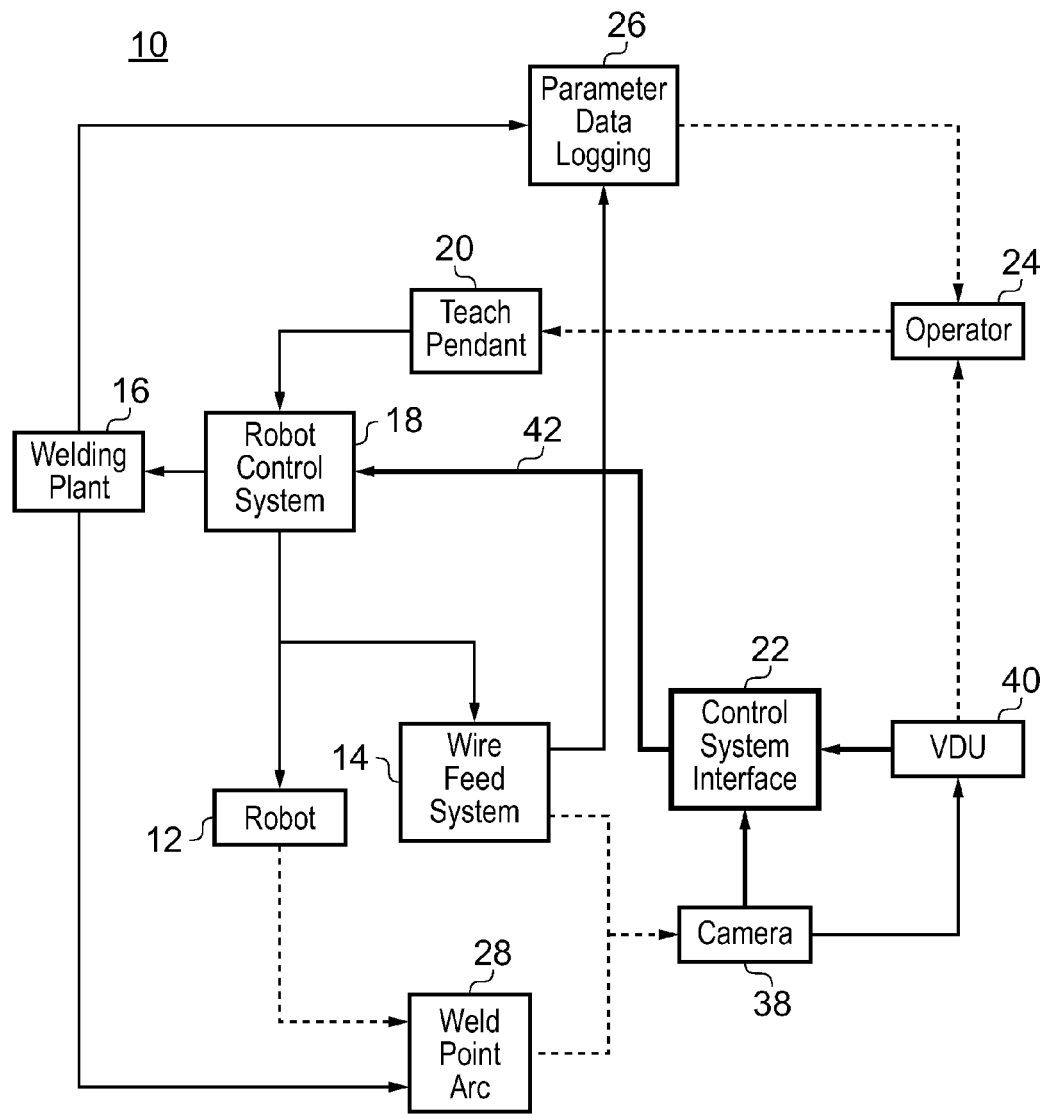
FIG. 1 schematically shows a welding apparatus according to the present invention.

As shown in FIG. 1, a welding apparatus 10 comprises a robot 12, a wire feed system 14 and a welding plant 16 that are controlled by a robot control system 18. In this embodiment the welding plant 16 is a TIG welding torch, having a tungsten electrode 17 (FIG. 2), that is mounted to the robot 12. The robot control system 18 is capable of being manually controlled by an operator 24 using a hand-held teach pendant 20 and can be automatically controlled by a control system interface 22. A parameter data logger 26 is connected to both the wire feed system 14 and the welding plant 16 and measures and records the values of pre-defined variables for the purposes of process traceability. The recorded parameters may include the voltage and current supplied to the welding plant 16 and the wire feed-rate, for example. The operator 24 can analyse the data recorded by the parameter data logger 26.

Figure 2:
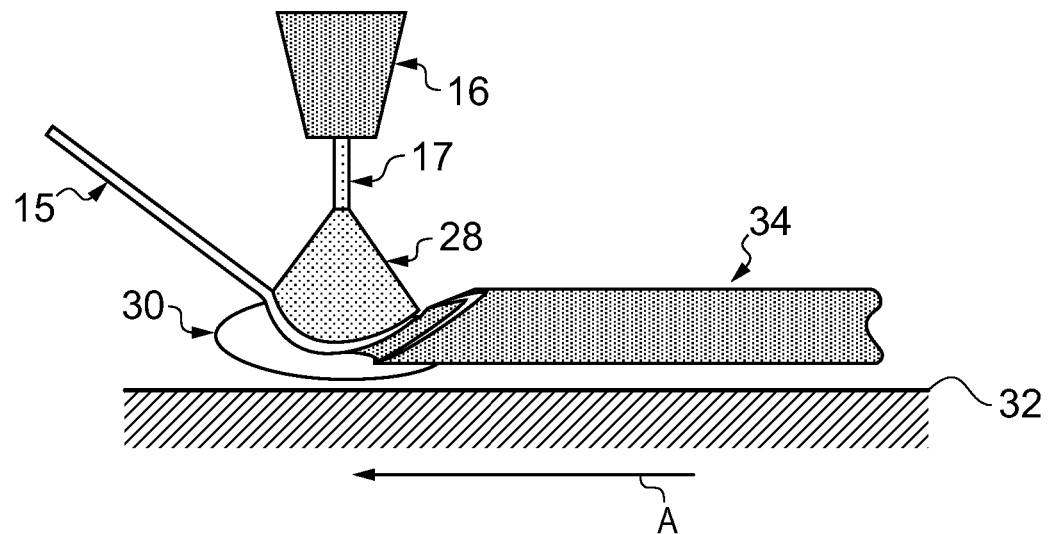
FIG. 2 schematically shows the process of welding on a substrate.

As shown in FIG. 2, during welding on a substrate 32 in the direction A, the welding torch 16 generates a weld arc 28 which interacts with the wire 15 fed by the wire feed system 14. The wire 15 becomes semi-plastic and produces a molten pool 30. This results in a weld bead 34 being deposited on the surface of the substrate 32.

Figure 3:
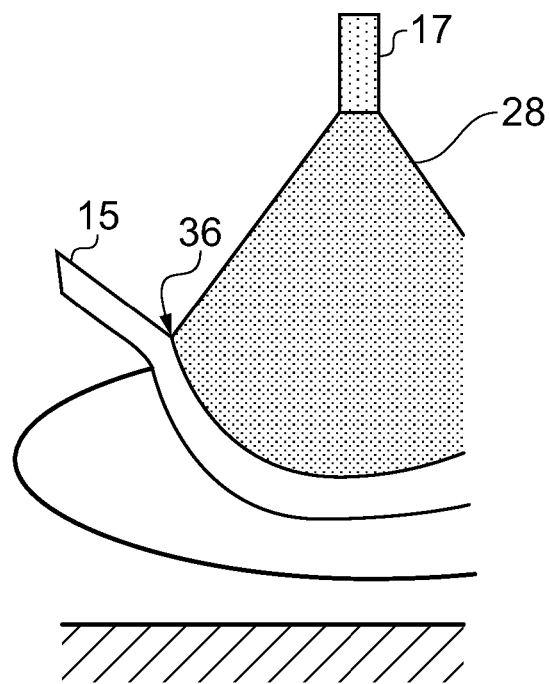
FIG. 3 schematically shows an enlarged view of the wire-welding arc interaction.

Referring now to FIG. 3, the position where the wire 15 interacts with the weld arc 28 is known as the wire-arc interaction point (WAIP) 36. Referring back to FIG. 1, the position of the WAIP 36 is monitored by a camera 38 which feeds its signal to both the control system interface 22 and a visual display unit (VDU) 40. The position of the camera 38 is fixed with respect to the welding plant 16 in order to maintain a fixed view of the process set-up. The VDU 40 includes a user interface which feeds back into the control system interface 22.

During use, the feedback loop 42 which connects the control system interface 22 to the robot control system 18 automates the welding process to ensure that the flow of wire 15 fed by the wire feed system 14 remains constant without manual process intervention. This removes the variability that would otherwise be present due to the manual operator.

There are two basic modes of operation of the system 10. The first is a learn mode 100 in which the control system 18 learns various parameters for autonomous operation. The second is an autonomous mode 200 in which the welding process is carried out without operator intervention based on the parameters learnt by the control system 18 during the learn mode 100.

Figure 4:
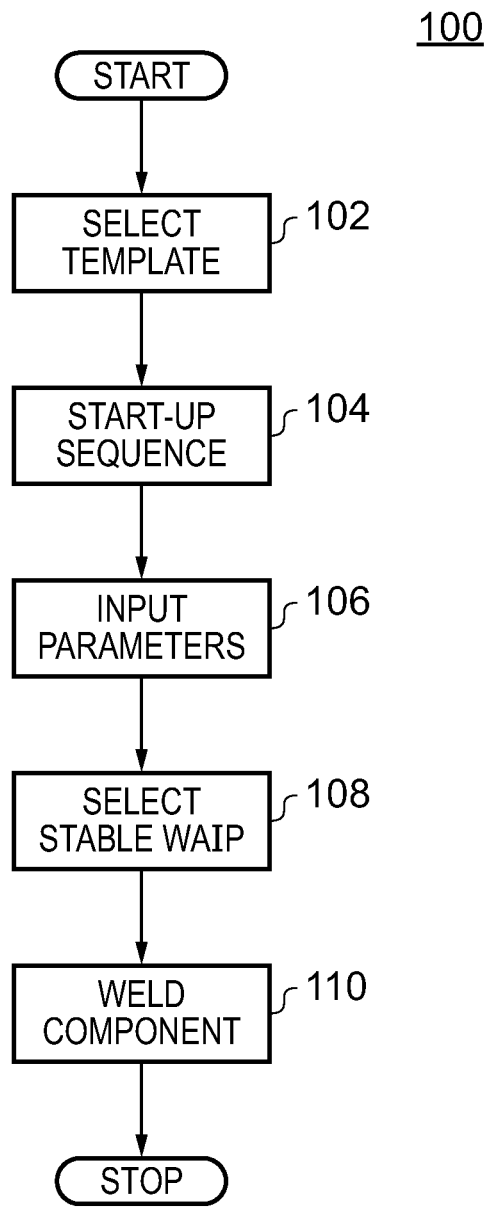
FIG. 4 shows a flow chart of a learn mode.

With reference to FIG. 4, in the learn mode 100 the operator selects a template 102, which may be welding of a specific component.

A start-up sequence 104 is run in which various parameters are input 106 to the control system 18 using the teach pendant 20 or directly into the robot control system 18. These parameters may include the distance between the surface of the component which is to be welded and the tip of the welding torch, the angle of the wire feed relative to the surface of the component, the forward feed rate, the wire feed rate, and the distance between the tip of the wire and the tool centre point (TCP), which is the point of the component directly beneath the top of the welding torch. The input parameters are stored in a database of the robot control system 18 for the particular template selected. Welding is then commenced and the operator waits for the WAIP 36 to become stable. This is known as the process stabilisation point. The WAIP 36 will be observed by the user from the VDU 40.

Typical set-up parameters may be:
Tungsten electrode width of 2.4 mm;
Distance between the TCP and the tungsten electrode tip of 6 mm;
Wire at 45° relative to the substrate;
Forward feed of 5 mm/sec to 10 mm/sec;
Nominal wire feed rate of 0.8 m/min to 1.7 m/min;
Distance between TCP and leading edge of wire of 1 mm.

Figure 5:
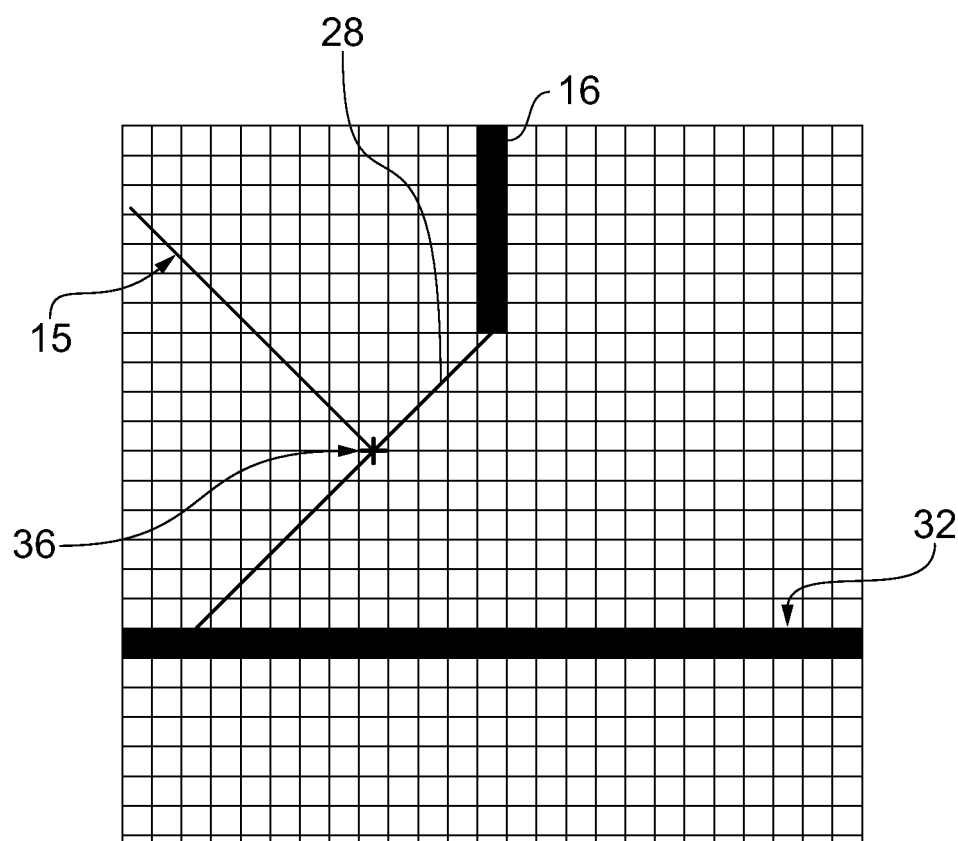
FIG. 5 schematically shows the display on a VDU of the apparatus of FIG. 1.

Once the WAIP 36 (FIG. 5) has become stable the operator electronically selects it 108 and identifies it using the VDU 40. This nominal stable WAIP 44 is then stored in the database of the robot control system 18 for the particular template selected. The component is then welded 110 based on the specific template selected. The camera 38 monitors the WAIP 36 and feeds this information to the control system interface 22 which in turn communicates with the robot control system 18. If the WAIP 36 deviates from the nominal stable WAIP 44 then the wire feed rate of the wire feed system 14 is adjusted. The wire feed rate is adjusted based on an algorithm in order to return the WAIP 36 to the nominal WAIP 44.

Figure 6:
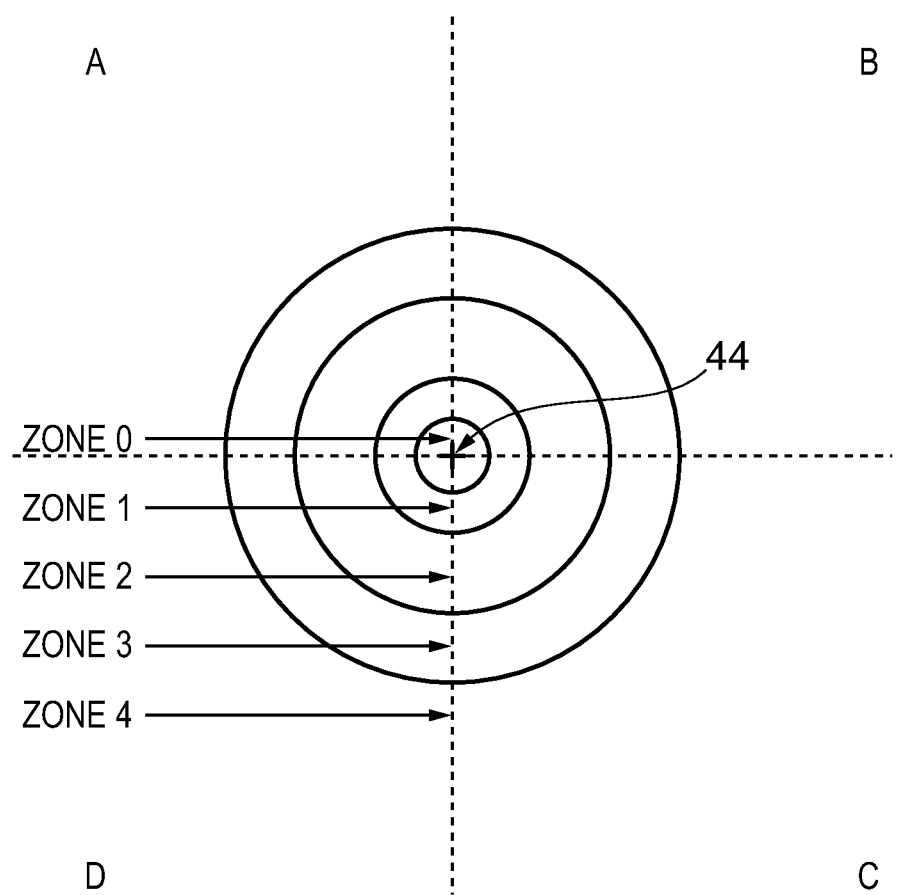
FIG. 6 schematically shows zones and quadrants centred on the nominal wire arc interaction position.

The algorithm will now be described with reference to FIG. 6. Five zones 0, 1, 2, 3, 4 are defined around the nominal stable WAIP 44. The radius of zone 0 is equal to 10% of the wire diameter, the radius of zone 1 is 0.5 mm, the radius of zone 2 is 1 mm, the radius of zone 3 is 1.5 mm and zone 4 is anything beyond zone 3. Four quadrants A, B, C, D are also defined around the nominal stable WAIP 44.

The wire feed rate is changed based on the location of the WAIP 36 in order to return the WAIP 36 to the nominal WAIP 44.

If the WAIP 36 is in Zone 0 then no action is taken.

If the WAIP 36 enters Zone 4 then welding is automatically stopped.

If in Quadrant A:

And in Zone 1 then the wire feed rate (m/min) is incrementally decreased by 3.75% of the wire diameter;

And in Zone 2 then the wire feed rate (m/min) is incrementally decreased by 7.5% of the wire diameter;

And in Zone 3 then the wire feed rate (m/min) is incrementally decreased by 15% of the wire diameter.

If in Quadrant B and the movement of the WAIP 36 from the nominal WAIP 44 in the y-axis is greater than the movement of the WAIP 36 from the nominal WAIP 44 in the x-axis:

And in Zone 1 then the wire feed rate (m/min) is incrementally decreased by 3.75% of the wire diameter;

And in Zone 2 then the wire feed rate (m/min) is incrementally decreased by 7.5% of the wire diameter;

And in Zone 3 then the wire feed rate (m/min) is incrementally decreased by 15% of wire diameter.

If in Quadrant B and the movement of the WAIP 36 from the nominal WAIP 44 in the y-axis is less than the movement of the WAIP 36 from the nominal WAIP 44 in the x-axis:

And in Zone 1 then the wire feed rate (m/min) is incrementally increased by 3.75% of the wire diameter;

And in Zone 2 then the wire feed rate (m/min) is incrementally increased by 7.5% of the wire diameter;

And in Zone 3 then the wire feed rate (m/min) is incrementally increased by 15% of the wire diameter.

If in Quadrant C:

And in Zone 1 then the wire feed rate (m/min) is incrementally increased by 3.75% of the wire diameter;

And in Zone 2 then the wire feed rate (m/min) is incrementally increased by 7.5% of the wire diameter;

And in Zone 3 then the wire feed rate (m/min) is incrementally increased by 15% of the wire diameter;

If in Quadrant D and the movement of the WAIP 36 from the nominal WAIP 44 in the y-axis is greater than the movement of the WAIP 36 from the nominal WAIP 44 in the x-axis:

And in Zone 1 then the wire feed rate (m/min) is incrementally increased by 3.75% of the wire diameter;

And in Zone 2 then the wire feed rate (m/min) is incrementally increased by 7.5% of the wire diameter;

And in Zone 3 then the wire feed rate (m/min) is incrementally increased by 15% of the wire diameter.

If in Quadrant D and the movement of the WAIP 36 from the nominal WAIP 44 in the y-axis is less than the movement of the WAIP 36 from the nominal WAIP 44 in the x-axis:

And in Zone 1 then the wire feed rate (m/min) is incrementally decreased by 3.75% of the wire diameter;

And in Zone 2 then the wire feed rate (m/min) is incrementally decreased by 7.5% of the wire diameter;

And in Zone 3 then the wire feed rate (m/min) is incrementally decreased by 15% of the wire diameter.

The definition of the zones and the adjustments above are based on the typical set-up parameters and they ensure that the wire 15 does not make direct contact with either the substrate 32 or the electrode 17.

For a particular welding template the learn mode 100 may be repeated a number of times, for example 50 times, in order to build up the database. When the learn mode 100 is run after the initial run for a particular welding template, it may automatically recall the start-up parameters instead of them having be input manually in step 106. However, the operator may intervene at any time and change these parameters using the teach pendant 20. If any changes are made by the operator, these are recorded to the database.

After the learn mode 100 has been run a number of times for a particular template, the welding apparatus 10 is capable of automatically welding based on the stored welding template.

Figure 7:
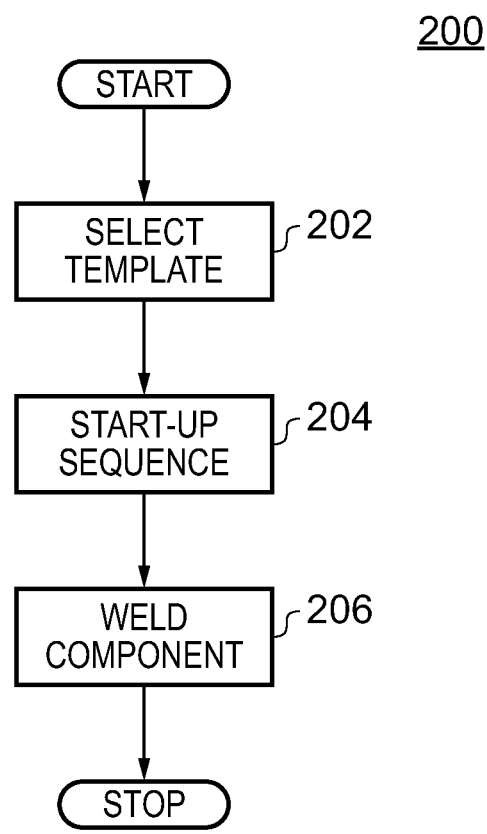
FIG. 7 shows a flow chart of an autonomous mode.

Referring to FIG. 7, in the autonomous mode 200 the operator selects a template 202 and a start-up sequence 204 is run. In the start-up sequence 204 the start-up parameters, that were learnt during the learn mode 100, are recalled from the database and they control the start-up inputs and move the welding apparatus towards a stable state. The robot control system 18 then sets the nominal WAIP 44 based on the information stored in the database during the learn mode 100. Welding 206 is then commenced and the position of the WAIP 36 is monitored using the camera 38. As described above, if the WAIP 36 deviates from the nominal stable WAIP 44 then the wire feed rate of the wire feed system 14 is adjusted based on an algorithm in order to return the WAIP 36 to the nominal WAIP 44. The algorithm used is the same as that described above for the learn mode 100.

At any point in time the operator may manually intervene to alter the operation parameters. Any changes may be recorded in the database.

The above described method and apparatus allows a component to be welded without an operator having to visually monitor the welding process and adjust parameters, such as the wire feed rate, in order to produce a good weld.

Currently the speed of parameter adjustment is restricted by the reaction time of the operator. In the present invention, the control system 18, 22 is able to react quickly to any deviation in the WAIP 36 from the nominal WAIP 44. This results in a consistent flow of wire fed metal during the welding process, thus improving weld quality. The present invention significantly decreases the need for a full time operator, decreases the amount of operator intervention and enables greater confidence in the welding process.

Although it has been described above that the wire feed rate is adjusted in order to maintain a stable WAIP, other parameters could be adjusted to obtain the same effect.

The invention could also be applied to the deposition of any wire fed material (metal or plastics) that is incorporated into or becomes the final component or feature. Alternative heat sources to create the molten pool may be used as an alternative to the TIG welding torch, for example laser or electron beam, provided that an interaction point between the wire and the heat source can be defined.

The invention claimed is:

1. A method of automatically controlling welding using a welding apparatus, the method comprising the following steps:

providing a heat-source that generates a welding-arc;

providing a wire feed for feeding wire to a wire interaction position, the wire interaction position being a position where the wire feed interacts with the welding-arc; and providing a control system comprising: a pre-programmed robot control system, a control system interface, and a camera configured to record the wire interaction position and communicate the recording to the control system interface, wherein the control system is configured to:

set at least one welding parameter having an adjustable magnitude and direction;

set a stable wire interaction position with a defined tolerance, the stable wire interaction position being a position where the wire fed by the wire feed interacts with the welding-arc so as to produce a weld having pre-defined qualities;

define a number of zones with respect to the stable wire interaction position, a first zone being defined based on a diameter of the wire;

monitor whether the wire interaction position deviates from the defined tolerance of the stable wire interaction position during welding;

determine which zone the wire interaction position is located in;

automatically alter the magnitude and direction of the at least one welding parameter to return the wire interaction position to within the defined tolerance of the stable wire interaction position if the wire interaction position deviates from the defined tolerance of the stable wire interaction position during welding, wherein the alteration of the magnitude and direction of the at least one welding parameter is dependent on which of the number of defined zones the wire interaction position is located in, and the at least one welding parameter comprises at least a wire feed rate adjusted in accordance with a pre-programmed algorithm based on which of the number of defined zones the wire interaction position is located in.

2. A method according to claim 1, wherein the defined tolerance is zero.

3. A method according to claim 1, wherein the wire interaction position is monitored by the camera.

4. A method according to claim 1, wherein the number of zones are concentrically arranged around the stable wire interaction position.

5. A method according to claim 1, wherein sub-zones are defined within the number of zones and wherein the alteration of the magnitude and direction of the at least one welding parameter is dependent on which sub-zone the wire interaction position is located in.

6. A method according to claim 5, wherein the number of zones are divided into quadrants which define the sub-zones and wherein the alteration of the magnitude and direction of the at least one welding parameter is dependent on which sub-zone the wire interaction position is located in.

7. A welding system for automatically controlling welding, the welding system comprising:

a heat-source that generates a welding-arc;

a wire feed for feeding wire to a wire interaction position, the wire interaction position being a position where the wire feed interacts with the welding-arc; and a control system comprising: a pre-programmed robot control system, a control system interface, and a camera configured to record the wire interaction position and communicate the recording to the control system interface, wherein:

the control system is configured to:

set at least one welding parameter having an adjustable magnitude and direction;

set a stable wire interaction position with a defined tolerance, the stable wire interaction position being a position where the wire fed by the wire feed interacts with the welding-arc so as to produce a weld having pre-defined qualities;

define a number of zones with respect to the stable wire interaction position, a first zone being defined based on a diameter of the wire;

monitor whether the wire interaction position deviates from the defined tolerance of the stable wire interaction position during welding; and alter automatically the at least one welding parameter having the adjustable magnitude and direction to return the wire interaction position to within the defined tolerance of the stable wire interaction position if the wire interaction position deviates from the defined tolerance of the stable wire interaction position during welding;

the alteration of the magnitude and direction of the at least one welding parameter is dependent on which of the number of defined zones the wire interaction position is located in; and the at least one welding parameter comprises at least a feed rate adjusted in accordance with a pre-programmed algorithm based on which of the number of defined zones the wire interaction position is located in.

8. An apparatus according to claim 7, wherein the defined tolerance is zero.

9. An apparatus according to claim 7, wherein sub-zones are defined within the number of zones and wherein the alteration of the magnitude and direction of the at least one welding parameter is dependent on which sub-zone the wire interaction position is located in.

10. An apparatus according to claim 7, wherein the number of zones are divided into quadrants which define sub-zones and wherein the alteration of the magnitude and direction of the at least one welding parameter is dependent on which sub-zone the wire interaction position is located in.

11. An apparatus according to claim 7, wherein the heat source that generates a welding-arc is a TIG welding torch and the wire interaction position is a wire-arc interaction point at which the wire meets the welding-arc.

12. An apparatus according to claim 7, wherein the number of zones are circular.

13. An apparatus according to claim 12, wherein the number of zones are arranged concentrically.

14. An apparatus according to claim 7, wherein the number of zones each have a constant radius.

15. An apparatus according to claim 7, wherein when the wire interaction position is located in the first zone, the wire feed rate is not adjusted.

16. An apparatus according to claim 7, wherein when the wire interaction position is located in a second zone with a radius that is greater than a radius of the first zone, the wire feed rate is incrementally decreased.

17. An apparatus according to claim 7, wherein when the wire interaction position is located in a third zone with a radius that is greater than a radius of a second zone, the wire feed rate is zero.

* * * * *